(12) United States Patent
Cantu

(10) Patent No.: US 9,176,767 B2
(45) Date of Patent: Nov. 3, 2015

(54) NETWORK INTERFACE CARD DEVICE PASS-THROUGH WITH MULTIPLE NESTED HYPERVISORS

(71) Applicant: Cisco Technology, Inc., San Jose, CA (US)

(72) Inventor: Cesare Cantu, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 274 days.

(21) Appl. No.: 13/860,552

(22) Filed: Apr. 11, 2013

(65) Prior Publication Data

US 2014/0310704 A1 Oct. 16, 2014

(51) Int. Cl.
*G06F 9/455* (2006.01)

(52) U.S. Cl.
CPC .. *G06F 9/45558* (2013.01); *G06F 2009/45566* (2013.01); *G06F 2009/45595* (2013.01)

(58) Field of Classification Search
CPC ................. G06F 9/45558; G06F 2009/45566; H04L 49/70
USPC ............................................................. 718/1
See application file for complete search history.

(56) References Cited

U.S. PATENT DOCUMENTS

| | | | |
|---|---|---|---|
| 7,743,389 B2 * | 6/2010 | Mahalingam et al. ........ 719/321 |
| 7,945,436 B2 * | 5/2011 | Ang et al. ........................ 703/23 |
| 8,386,642 B2 * | 2/2013 | Elzur ............................. 709/241 |
| 8,490,090 B2 * | 7/2013 | Ben-Yehuda et al. ............ 718/1 |
| 2009/0119087 A1 * | 5/2009 | Ang et al. ........................ 703/23 |
| 2010/0223397 A1 * | 9/2010 | Elzur ............................. 709/235 |
| 2011/0072428 A1 * | 3/2011 | Day et al. .......................... 718/1 |
| 2011/0153909 A1 * | 6/2011 | Dong ................................ 711/6 |
| 2011/0243136 A1 * | 10/2011 | Raman et al. ................. 370/392 |
| 2012/0005521 A1 * | 1/2012 | Droux et al. .................. 714/4.11 |
| 2012/0131574 A1 * | 5/2012 | Day et al. .......................... 718/1 |
| 2012/0216187 A1 * | 8/2012 | Ben-Yehuda et al. ............ 718/1 |
| 2012/0307828 A1 * | 12/2012 | Agarwal et al. ............... 370/392 |
| 2013/0094506 A1 * | 4/2013 | Song ............................. 370/390 |
| 2013/0263118 A1 * | 10/2013 | Kannan et al. .................... 718/1 |
| 2013/0322457 A1 * | 12/2013 | Budhia et al. ................. 370/401 |
| 2014/0003428 A1 * | 1/2014 | Li et al. ......................... 370/390 |
| 2014/0156906 A1 * | 6/2014 | Babu et al. .................... 710/316 |
| 2014/0269710 A1 * | 9/2014 | Sundaram et al. ............ 370/392 |
| 2015/0163072 A1 * | 6/2015 | Kalkunte et al. .............. 370/392 |

OTHER PUBLICATIONS

Blog site by Ivan Pepelnjak "Port or Fabric Extender", Aug. 18, 2010. "http://blog.ipspace.net/2010/08/port-or-fabric-extenders.html".*
IEEE 802 Tutorial: Edge Virtual Bridging, draft, Nov. 2009, pp. 1-54.*
Cisco, "Virtual Machine Networking: Standards and Solutions," White Paper, Aug. 2011, pp. 1-10.
Cisco, "Cisco Fabric Extender Technology," At-A-Glance, Feb. 2013, pp. 1-2.

* cited by examiner

*Primary Examiner* — Emerson Puente
*Assistant Examiner* — Willy W Huaracha
(74) *Attorney, Agent, or Firm* — Edell, Shapiro & Finnan, LLC

(57) ABSTRACT

In a data center computing system, multiple nested hypervisors are run, including an outer hypervisor and at least one inner hypervisor running as a virtual machine on top of the outer hypervisor. A guest operating system is run as a virtual machine in the innermost hypervisor. An emulated network interface card device is executed in all hypervisors. An extender component is executed in the outer hypervisor and an extender component is executed in the inner hypervisors such that the extender components in the outer hypervisor and in the inner hypervisors are architecturally cascaded. An interface for the guest operating system is assigned to the emulated network interface card device in each of the outer hypervisor and the inner hypervisors to enable network communications to bypass the outer hypervisor and the inner hypervisors.

21 Claims, 7 Drawing Sheets

NETWORK INTERFACE CARD DEVICE PASS-THROUGH WITH MULTIPLE NESTED HYPERVISORS

TECHNICAL FIELD

The present disclosure relates to networking in virtualized computing systems.

BACKGROUND

An (inner) hypervisor running as Virtual Machine (VM) on top of an (outer) hypervisor is a powerful kind of software container for a guest Operating System (OS) running within the inner hypervisor. One use case of this is when the enterprise Information Technology (IT) administrator wants to reduce the operational cost of the VM by running the VM in the cloud, while maintaining the service in the VM available all the time. A solution is for the enterprise IT administrator to live migrate a VM from a server on-premises to a server off-premises leased from a cloud data center provider. Moreover, the server on-premises may run a given hypervisor brand, whereas the server in the cloud may run a different hypervisor brand.

An instance of the source hypervisor brand (used on-premises) is created as an inner hypervisor-VM on the destination hypervisor in the cloud data center, forming two "nested hypervisor instances". The original VM may then be live-migrated from the on-premise server to the inner hypervisor-VM in the cloud datacenter. This solution is practical because running a generic VM on two nested hypervisors is supported, to various degrees, in commercially available hypervisors.

BRIEF DESCRIPTION OF THE DRAWINGS

FIG. 2 is a more detailed block diagram of the multiple nested hypervisor system configured for network interface card device pass-through.

DESCRIPTION OF EXAMPLE EMBODIMENTS

Overview

Figure 1:
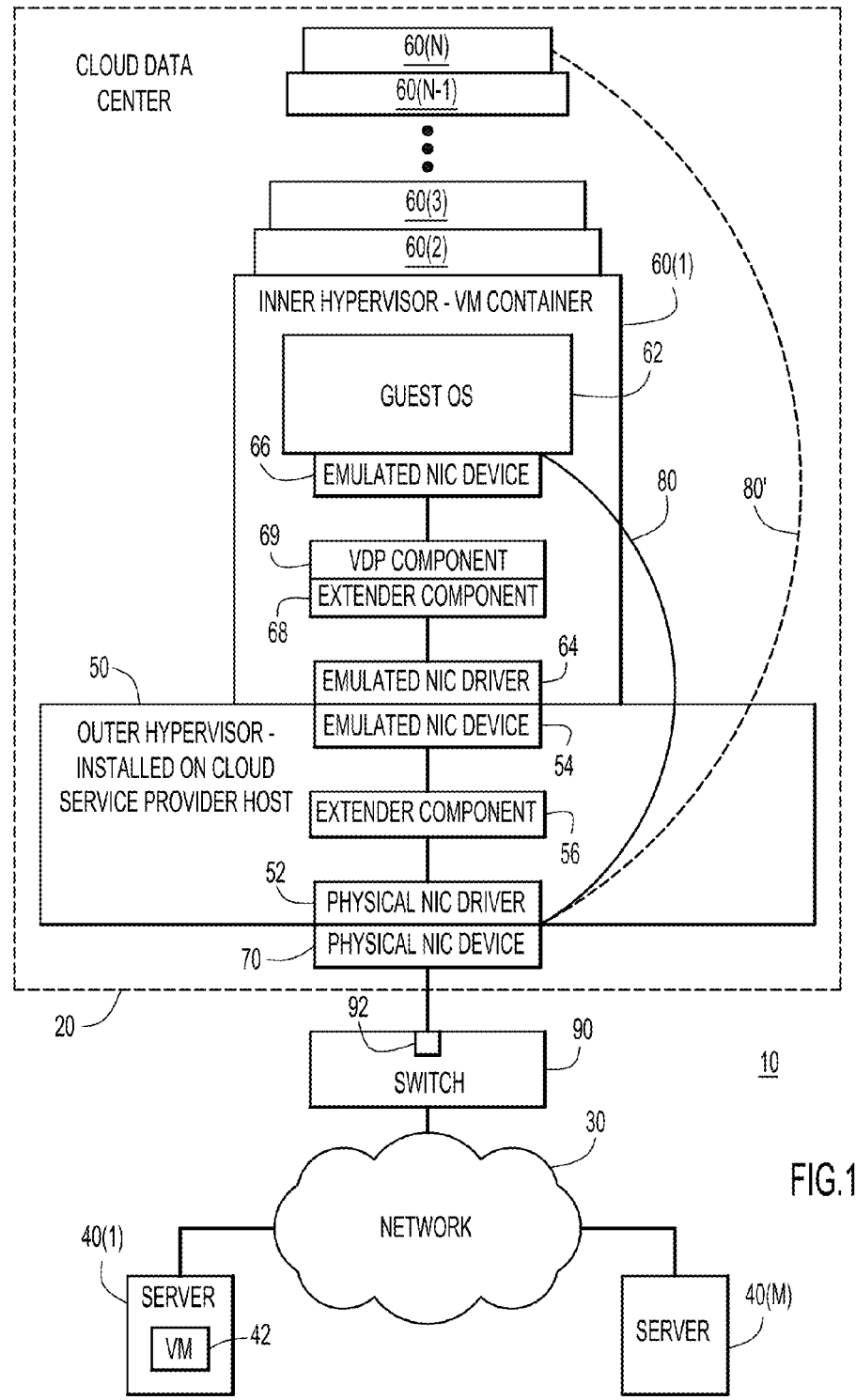
FIG. 1 is a diagram illustrating a multiple nested hypervisor system configured for multiple hypervisor bypass in a cloud data center environment.

In a data center computing system, multiple nested hypervisors are run, including an outer hypervisor and at least one inner hypervisor running as a virtual machine on top of the outer hypervisor. A guest operating system is run as a virtual machine in the inner hypervisor. An emulated network interface card device is executed in the inner hypervisor and an emulated network interface card device is executed in the outer hypervisor. An extender component is executed in the outer hypervisor and an extender component is executed in the inner hypervisor such that the extender components in the outer hypervisor and the inner hypervisor are architecturally cascaded. Using the extender components in the outer hypervisor and in the inner hypervisor, an interface for the guest operating system is assigned to the emulated network interface card device in each of the outer hypervisor and the inner hypervisor to enable network communications between the guest operating system and a network interface card device while bypassing both the outer hypervisor and the inner hypervisor.

Example Embodiments

Presented herein are techniques to achieve bypass of multiple nested hypervisors in a manner that is completely transparent to entities outside of the virtualized computing environment. Passing a network interface card (NIC) through a hypervisor to a guest operating system (OS) is a powerful method to provide improved, scalable and predictable system networking performance in terms of both throughput and latency.

There exist today methods to pass a NIC through a single hypervisor which meet enterprise grade standards of high performance networking, safety, manageability and support for VM migration. These methods involve switching the runtime operational mode of a NIC dynamically between emulation and pass-through.

Passing a NIC through two, or more, nested hypervisors in a safe and manageable way would offer similar or more benefits. The terms "bypass" and "pass-through" are used herein interchangeably to mean directing network traffic around or passed hypervisors, e.g., tow or more nested hypervisors. Within the use cases described above, more specific use cases include the following.

Use Case 1:

The IT administrator has configured the VM to use a NIC in pass-through mode on-premises because the VM needs high and predictable networking input/output (I/O) performance. After the VM has live migrated to the cloud data center, the IT administrator wants the VM to continue to use the NIC in pass-through mode and interact directly with hardware for network I/O, in order for the VM to maintain the level of networking I/O performance. For example, the IT administrator wants the application software running in the guest OS to maintain "close to native" networking performance, similar to when the same guest OS is running on a bare metal server. By contrast, if the inner hypervisor-VM and/or the outer hypervisor is running the NIC in emulation mode, that introduces a significant amount of networking performance overhead and it is more difficult to predict because it is more subject to environmental conditions (e.g., overall server utilization). As a result, maintaining a service level agreement of the kind "close-to-native networking performance" after the VM is migrated to the cloud may become impractical.

Use Case 2:

The workload running in the VM is network bound. After the VM has live migrated to the cloud data center and it is running on the inner hypervisor-VM, a non trivial amount of the server central processing unit (CPU) processing power maybe used to run the software device emulation and the software networking stack of both nested hypervisors. This is usually the case when a practical network intensive workload runs in a VM. The service provider may want the VM to use a NIC in pass-through mode and interact directly with hardware for network I/O, in order to free up the CPU processing power on the server, otherwise used to run both hypervisors' device emulation and networking stack software. That allows a higher VM-per-server consolidation ratio and, in turn, lower per-VM total cost of ownership for the service provider.

However, today passing a NIC through two nested hypervisors is not possible, even when the two nested hypervisors are of the same brand. State-of-the-art implementation techniques used to pass a NIC through a single hypervisor cannot be readily used to pass a NIC through multiple nested hypervisors because they have the following drawbacks.

Virtual Network Stacking Inconsistency

Each hypervisor has its own state of a guest OS interface including network interface identity (number, a name and metadata) and the interface association to a virtual switch within the hypervisor. A guest OS network interface must be connected to the virtual switch in the inner hypervisor, which is connected to a NIC in the inner hypervisor. The interface of the virtual switch in the inner hypervisor must be connected to a virtual NIC in the outer hypervisor, and so on. As result, between the guest OS and the physical network, there could be either two independent virtual switches when the interface is in emulation mode, or no virtual switch when the interface is in pass-through mode. That ties a NIC transition between emulation and pass-through mode with virtual network topology change and/or re-configuration events which creates network operations challenges.

Furthermore, each hypervisor flavor (brand or type) has its own virtual network connectivity implementation, often proprietary, such as VMware vSphere vSwitch, Microsoft Hyper-V Virtual Switch, Xen Open vSwitch. Furthermore, some hypervisors have multiple flavors of network connectivity elements. For example, KVM Linux has bridge or media access control MacVTap. MacVTap is a device driver meant to simplify virtualized bridged networking. In each hypervisor flavor, the implementation of pass-through is very much tied with the base networking connectivity elements. For example, VMware VM Direct IO with VMotion is tied to vSphere Distributed Virtual Switch (DVS). The proliferation of virtual switches implementations causes challenges in coordinating a NIC transition between pass-through and emulation mode in multiple nested hypervisor instances of different types.

Emulated Virtual NIC Device Model Inconsistencies

Hypervisor implementations of pass-through are converging to the Single Root IO Virtualization (SR-IOV) hardware NIC device model. However, each hypervisor implementation is tied to a different and mostly proprietary para-virtualized NIC device model presented to the guest OS: vmxent3 in VMware vSphere hypervisor, the synthetic NIC in Microsoft Hyper-V, VFIO in Linux KVM. These variations make it difficult to use the current hypervisor's form of pass-through to achieve multiple hypervisors pass-through.

Reference is now made to FIG. 1. FIG. 1 is a software functional diagram of a system 10 that is configured to achieve bypass (i.e., "pass-through") of multiple nested hypervisors in a manner that is completely transparent to entities outside of the virtualized computing environment. Using these techniques that are described in more detail below, there is no need to sustain the system states in which only one hypervisor, either the inner or the outer, has a NIC in pass-through mode. Two macro system states are sufficient: either the NIC operates in emulation mode in both hypervisors, or the NIC operates in pass-through mode in both hypervisors.

The system 10 comprises a cloud data center 20 that is accessible over a network 30 by one or more servers 40(1)-40(M). Server 40(1) has a virtual machine (VM) 42 running thereon, as an example. The cloud data center 20 includes nested hypervisors. There is an outer hypervisor 50 installed on a cloud service provider host of the cloud data center 20 and one or more nested inner hypervisors 60(1)-60(N) each running as a VM within its outer hypervisor The hypervisors 60(1)-60N) are not peers. Instead, the outer hypervisor 50 and the inner hypervisors 60(1)-60N) all are nested. In other words, hypervisor 50 is the outer hypervisor to hypervisor 60(1), the (N−1)th hypervisor 60(N−1) is the outer hypervisor of the Nth hypervisor 60(N), and the Nth hypervisor 60(N) is the inner hypervisor of the (N−1)th hypervisor 60(N−1). The first hypervisor (outer hypervisor 50) is the outermost hypervisor and the Nth hypervisor 60(N) is the innermost. In the example of FIG. 1, the inner hypervisor 60(1) serves as software container for a guest operating system (OS) 62 running within the inner hypervisor 60(1). While not shown as such in FIG. 1, for simplicity, there may be a guest OS running in any of the nested inner hypervisors 60(1)-60(N).

To enable network communications outside of the cloud data center 20, there is a physical network interface card (NIC) device 70 that communicates with the network 30. The physical NIC device 70 supports pass-through. Within the outer hypervisor 50, there is a physical NIC driver 52 to enable operations of the physical NIC device 70 and an emulated NIC device 54 to enable network communications with the guest OS 62 running within the inner hypervisor 60(1). Similarly, in the inner hypervisor 60(1), there is an emulated NIC driver 64 and an emulated NIC device 66. The emulated NIC driver 64 runs operations of the emulated NIC device 54 in much the same way as the physical NIC driver 52 runs operations of the physical NIC device 70. Another term for emulated NIC device is "virtual" NIC (VNIC) or VIC.

The outer hypervisor 50 has an extender (software) component 56 and the inner hypervisor has a similar extender component 68. The extender components 56 and 68 may be a VM-Fabric Extender (VM-FEX) driver software component offered by Cisco Systems, Inc., or a Port Extender (PE) component compliant with the IEEE 802.1BR standard. The extender components 56 and 68 (VM-FEXs or PEs) may be architecturally cascaded. Therefore, the FEXes or PEs, one in each nested hypervisor instance, can be conveniently connected once as cascaded. The advantage of using multiple cascaded extender components within the nested hypervisors is that the extender components do not need to be configured because they are self-configuring. Similarly, VM NIC or physical NIC connections to each extender component need not be configured because they are self-configuring. By contrast, if multiple virtual switch components were used within the hypervisors, then each virtual switch would need to be configured and each VM NIC or physical NIC connection to each virtual switch would need to be configured as well.

More generally, the extender component, whether VM-FEX or PE, allows for a one-to-one connection between the physical NIC device 70 and the component above, e.g., the guest OS 62. From a user perspective, there is no need for network configuration, whereas a virtual switch must be configured and handles many-to-many connections.

VM-FEX

VM-FEX is a networking and network services software component offered by Cisco Systems, Inc., that delivers architectural flexibility and consistent networking across physical, virtual and cloud environment, enabling convergence, network scale, virtualization awareness, and intelligence. VM-FEX collapses virtual and physical networking into a single infrastructure. Data center administrators can provision, configure, manage, monitor, and diagnose virtual machine network traffic and bare metal network traffic within a unified infrastructure. The VM-FEX software extends a fabric extender technology to the virtual machine with several following capabilities: providing a dedicated interface on the parent switch for each VM, sending all virtual machine traffic directly to the dedicated interface on the switch; eliminating a software-based switch in the hypervisor.

VM-FEX eliminates the need for a virtual switch within a hypervisor by providing individual virtual machine virtual ports on the physical network switch. Virtual machine I/O is sent directly to the upstream physical network switch, which takes full responsibility for virtual machine switching and policy enforcement. This approach leads to consistent treatment for all network traffic, virtual or physical. VM-FEX consolidates virtual and physical switching layers into a single layer and reduces the number of network management points by an order of magnitude. VM-FEX is a pre-standard implementation of IEEE 802.1BR.

IEEE 802.1BR Port Extension

IEEE 802.1BR introduces a new software device called a Port Extender. One or more port extenders can be attached to a controlling switch. A controlling switch and its set of port extenders form a single extended switch. An extended switch is managed as a single entity through the controlling switch. Adding a port extender to a controlling switch is like adding a line card to a traditional switch.

When multiple PEs are cascaded, such as with multiple nested hypervisors as shown in FIG. 1, only one component executes virtual interface discovery protocol (VDP). The peer is always the first hop from the external network switch (i.e., the physical NIC device 70), which in this case is the outer hypervisor 50. One implementation is one in which the component farthest from the switch executes VDP. Cascaded PEs in between such component and the physical switch rely on VDP messages between such component and the switch. In this case, the component executing VDP would be in the inner hypervisor 60(1). In other words, the VDP component is terminated on top of the extender component of the innermost hypervisor (when there are multiple nested hypervisors). This is shown at reference numeral 69 in FIG. 1, on top of the extender component 68 in the inner hypervisor 60(1) in an example in which there is only one inner hypervisor 60(1). More generally, however, any of the nested hypervisors could execute VDP.

The host physical NIC device 70, the outer hypervisor 50, or a combination of the two run the complementary network protocols related to VM-FEX or IEEE 802.1BR, in concert with the peer networking switch 90 connected to the host. The network interface of the guest OS 62 gets assigned to a remotely managed network port 92 of switch 90, and in turn to an emulated NIC device within each hypervisor 50 and 60(1), as part of the VM-FEX or PE component operations within the hypervisors.

In addition to the use of VM-FEX or PE components in the outer and inner hypervisors, two further features are supported to allow for bypassing the NIC device through two (or more) hypervisors. First, an extension to each hypervisor flavor (type) of emulated NIC device model is used to provide the pass-through related control operations (as opposed to emulating the complete NIC hardware behavior in pass-through mode). Second, a delegation model application programming interface (API) is used where the inner hypervisor emulated NIC device 66 propagates pass-through related operations to the outer hypervisor emulated NIC device 54. In other words, a "chain of responsibility" design pattern is employed in order to link together the set of emulated NIC device instances, one in each hypervisor, which are assigned to the top level (or innermost) guest OS emulated NIC device.

The pass-through from the guest OS 62 in the inner hypervisor 60(1) to the physical NIC device 70 is shown at reference numeral 80 in FIG. 1, and more generally from a guest OS (not shown) in hypervisor 60(N) to physical NIC device 70 (bypassing multiple nested hypervisors) as shown at reference numeral 80'. This pass-through or bypass is made through two (or more) nested hypervisors, which is not heretofore known to be achievable.

Figure 2:
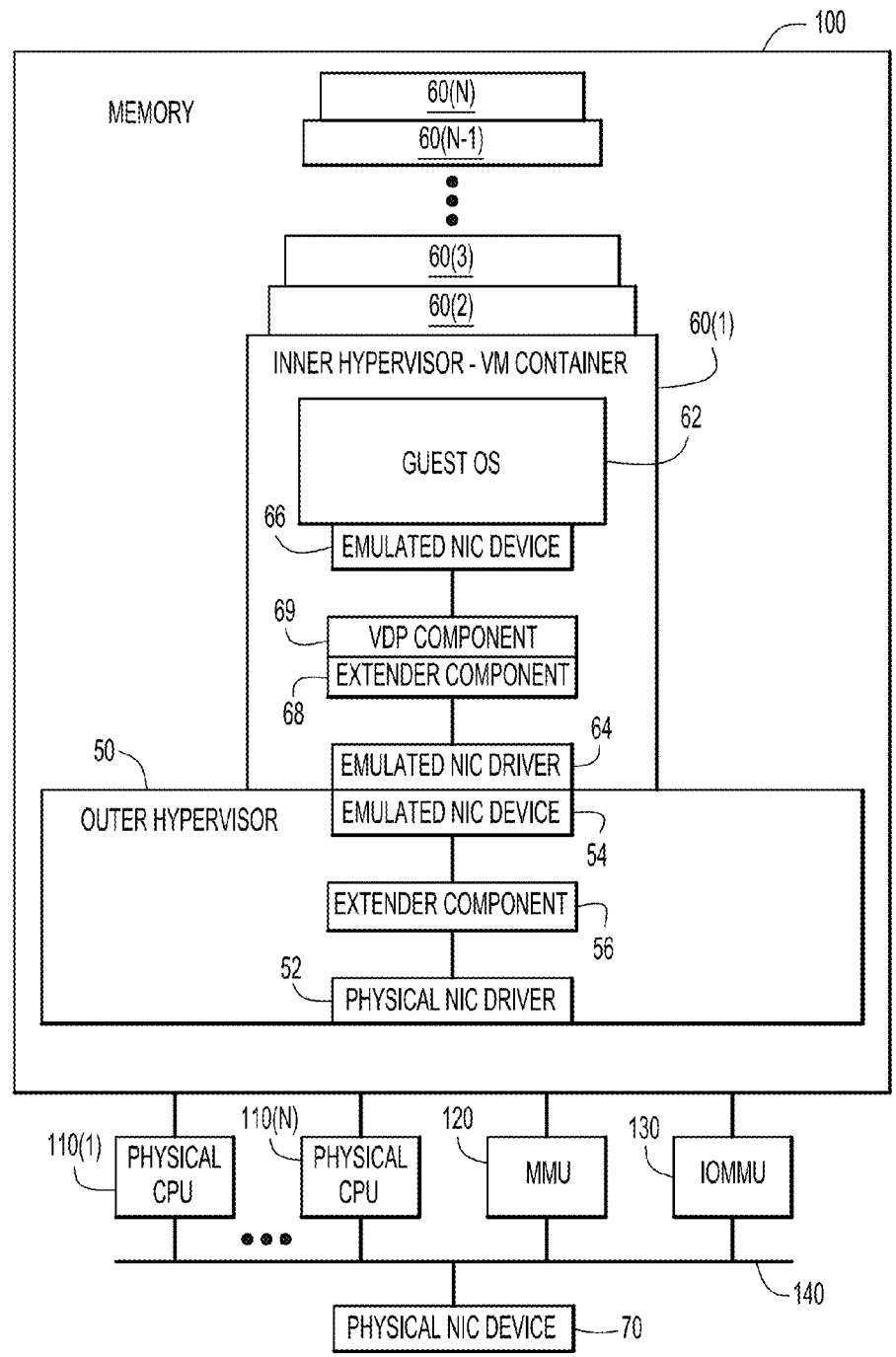

Reference is now made to FIG. 2. FIG. 2 is a hardware diagram showing an example of the physical equipment/devices on which the software components shown in FIG. 1 may reside. To this end, a memory 100 is provided that stores the software instructions/code for the outer hypervisor 50, physical NIC driver 52, emulated NIC device 54, VDP end-point (extender component) 56, inner hypervisor 60(1), guest OS 62, emulated NIC driver 64, emulated NIC device 66 and extender component 68 and VDP component 69. One or more processing units are coupled to the memory 100 to execute the software instructions stored in the memory 100. For example, there are one or more physical central processing units (CPUs) 110(1)-110(N), a memory management unit (MMU) 120 and an I/O MMU (IOMMU) 130 coupled to the memory 100 and to a bus 140. The physical NIC device 70 is coupled to the bus 140. Any one or more of the CPUs 110(1)-110(N) may access and execute the software instructions stored in memory 100.

Memory 100 may comprise read only memory (ROM), random access memory (RAM), magnetic disk storage media devices, optical storage media devices, flash memory devices, electrical, optical, or other physical/tangible memory storage devices. The CPUs 110(1)-110(N) are, for example, a microprocessor or microcontroller that executes instructions stored in the memory 100. Thus, in general, the memory 100 may comprise one or more tangible (non-transitory) computer readable storage media (e.g., a memory device) encoded with software comprising computer executable instructions and when the software is executed (by one or more of the CPUs 110(1)-110(N)) it is operable to perform the operations described herein.

Figure 3:
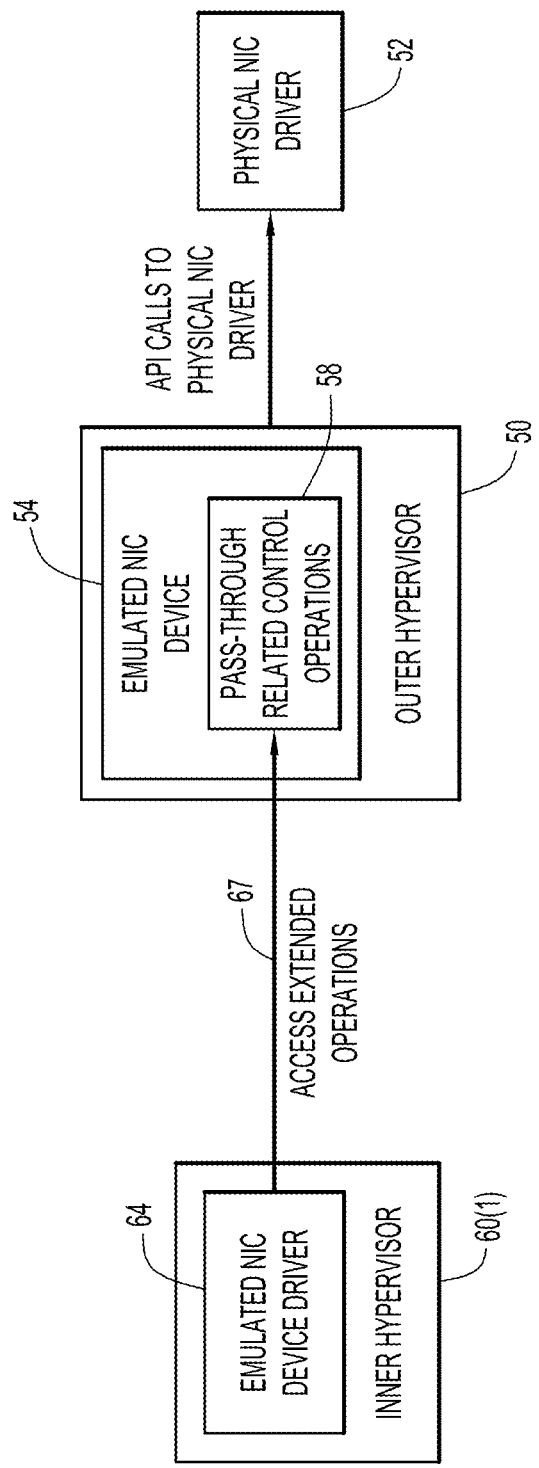
FIG. 3 is a diagram depicting the operations of various components in the multiple nested hypervisor system to enable multiple hypervisor bypass.

Turning now to FIG. 3, a high level description of the device model operations for the emulated NIC device 54 in the outer hypervisor 50 and emulated NIC device driver 64 in the inner hypervisor 60(1). The emulated NIC device 54 in the outer hypervisor 50 is extended to provide just (only) the pass-through related control operations 58 to the inner hypervisor 60(1). The pass-through related control operations 58 are APIs provided by the outer hypervisor 50 to the inner hypervisor 60(1). The inner hypervisor 60(1) accesses the extended (pass-through related control) operations 58 using emulated NIC device driver 64 as shown at reference numeral 67. The extended operations (device model extensions) include: allocating, configuring and freeing a device Virtual Function (VF); discovering hardware capabilities of the VF, such as Receive Side Scaling (RSS); discovering HW resources of the VF, such as number of queues and interrupts resources; configuring the hardware resources and features of a VF; setting-up and tearing-down interrupt resources; quiesce-ing the device; saving and restoring hardware state; and accumulating statistics.

To summarize, the emulated NIC device in all nested hypervisors are executed such that the emulated NIC device in the outer hypervisor provides just pass-through related control operations to the inner hypervisor, and the inner hypervisor accesses the pass-through related control operations using the NIC device driver. Moreover, the emulated NIC device is executed in all nested hypervisors such that the emulated NIC devices in all nested hypervisors operate in an emulation mode or the emulated NIC devices in all nested hypervisors operate in a pass-through mode.

As it is known in the art, the SR-IOV functionality is comprised of a Physical Function (PF) driver and a VF driver. The PF driver of a SR-IOV device is used to manage the Physical Function (PF) of an SR-IOV capable device. A Peripheral Control Interface (PCI) Function that supports the SR-IOV capabilities is defined in the SR-IOV specification. A PF contains the SR-IOV capability structure and is used to manage the SR-IOV functionality. PFs are fully featured PCI Express (PCIe) functions which can be discovered, managed, and manipulated like any other PCIe device. A PCI function that supports the SR-IOV capabilities as defined by the SR-IOV specification. A PF contains the SR-IOV capability structure and manages the SR-IOV functionality. PFs can be used to configure and control a PCIe device.

By contrast, a VF is associated with a PF. A VF is a light-weight PCIe function that shares one or more physical resources with the Physical Function and with other VFs that are associated with the same PF. Unlike a PF, a VF can only configure its own behavior.

The emulated NIC device 54 in the outer hypervisor 50, instead of emulating the hardware behaviors corresponding to the above operations, forwards the operations to the associated underlying physical NIC device driver 52 via API calls. The physical NIC device driver 52 provides appropriate returns to each operation to the outer hypervisor which forwards back the result of each operation to the emulated NIC device 54 and, in turn, to the inner hypervisor 60(1). For example, this behavior could be a new capability of the emulated device, perhaps a sub-set of SR-IOV capabilities.

Figure 4:
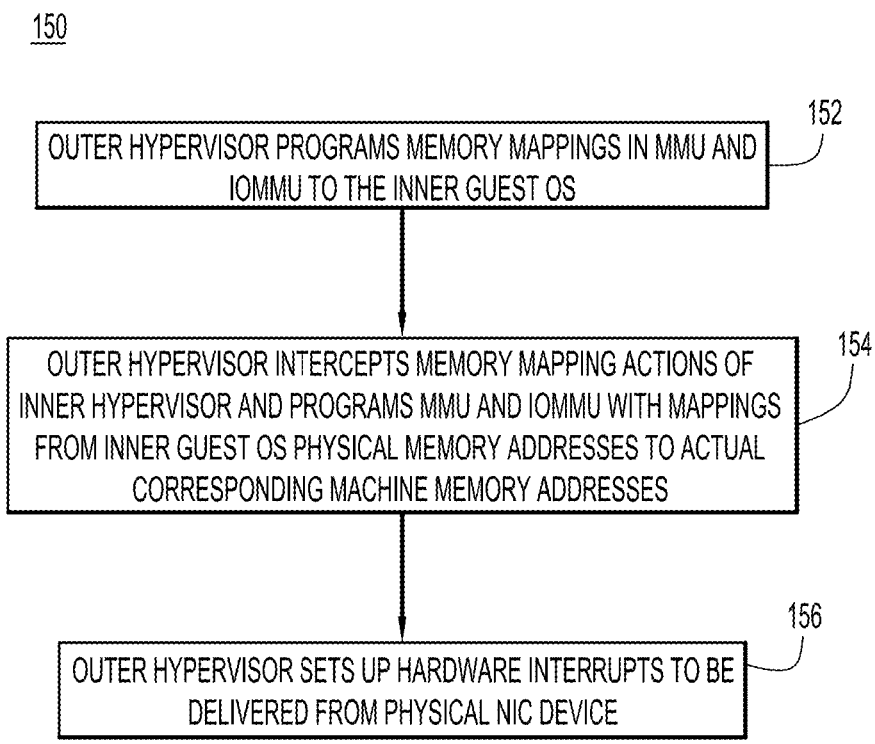
FIG. 4 is a flow chart depicting operations of the multiple nested hypervisor system to set up the handling of hardware interrupts.
Figure 5:
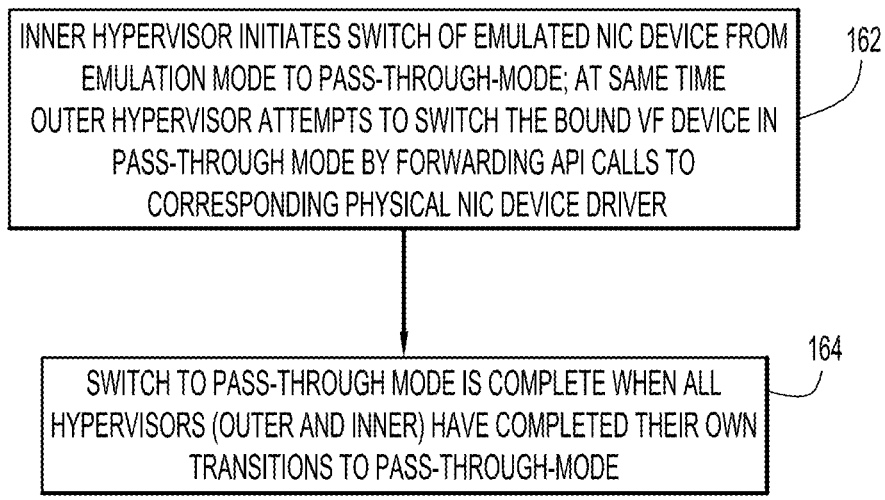
FIG. 5 is a flow chart depicting operations of the multiple nested hypervisor system to switch between emulation and pass-through mode in two or more hypervisor concurrently.
Figure 7:
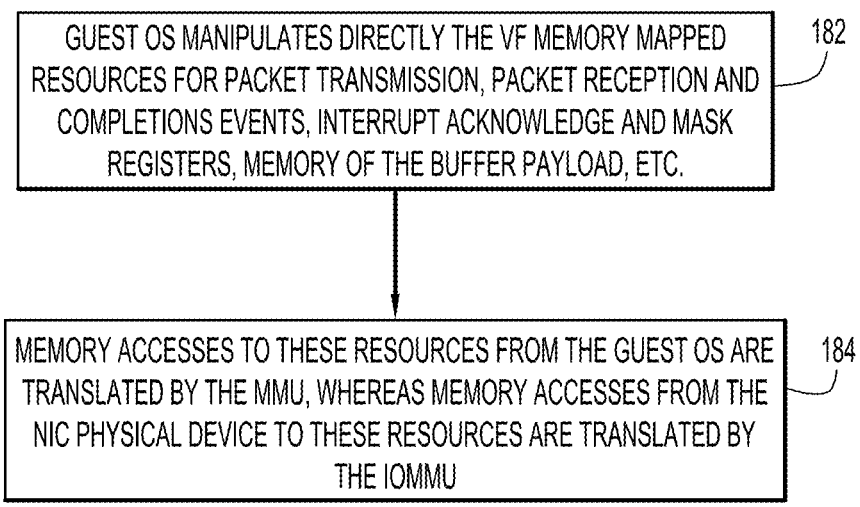
FIG. 7 is a flow chart depicting the operations of the multiple nested hypervisor system to achieve packet input/output between a physical network interface card device and a guest operating system running as a virtual machine in an inner hypervisor.

FIGS. 4, 5 and 7 illustrate flow charts depicting operations of the various hardware and software components of the system. In this regard, reference should be made to FIGS. 1 and 2 in connection with the descriptions of the flow charts in these figures.

Turning now to FIG. 4, a flow chart 150 is shown for operations of the MMU 120 and IOMMU 130. At 152, the outer hypervisor 50 programs appropriate memory mappings in the MMU 120 and in the IOMMU 130 to the inner guest OS 62. This could be done via APIs between outer and inner hypervisors (known as "hyper-calls"). Alternatively, the outer hypervisor 50 could emulate a virtual IOMMU device to the inner hypervisor 60(1).

When the inner hypervisor 60(1) programs memory mappings in the MMU 120 and IOMMU 130, then at 154 the outer hypervisor 50 intercepts the memory mapping actions and it knows the characteristics of the inner hypervisor (perceived) address space. Therefore, the outer hypervisor 50 programs the hardware MMU 120 and IOMMU 130 with mappings from the innermost guest OS physical memory addresses to the actual corresponding machine memory addresses.

At 156, the outer hypervisor 50 sets up hardware interrupts to be delivered from the real hardware device (physical NIC device 70) to the inner hypervisor emulated NIC device 66. This setup can be achieved via APIs between outer and inner hypervisors ("hyper-calls"). Alternatively, the outer hypervisor could emulate PCI interrupt functionality to the inner hypervisor.

With reference now to FIG. 5, a flow chart 160 is shown depicting the emergent system behavior during a NIC device transition from emulation to pass-through mode. At 162, the inner hypervisor 60(1) initiates the switch of the emulated NIC device 66 from emulation to pass-through mode. At the same time, the outer hypervisor 50 attempts also to switch the bound VF device in pass-through mode by forwarding the API calls to the physical NIC device driver 52 associated with the physical NIC device 70. At 164, the switch to pass-through mode is complete when both the nested hypervisors 50 and 60(1) have completed their own transitions to pass-through mode. In other words, the physical NIC device 70 manages operations in the pass-through mode when transition to pass-through mode is complete for the outer hypervisor 50 and the inner hypervisor 60(1).

Once the switch to pass-through mode is complete, the system relies on the physical NIC device VF behavior in pass-though mode. Packet I/O happens directly between the VF of the physical NIC device 70 and the guest OS 62. This is shown at reference numeral 170 in FIG. 6, and more generally at reference numeral 170' for I/O bypass between physical NIC device 70 and a guest OS in hypervisor 60(N) for bypass of multiple nested hypervisors.

Figure 6:
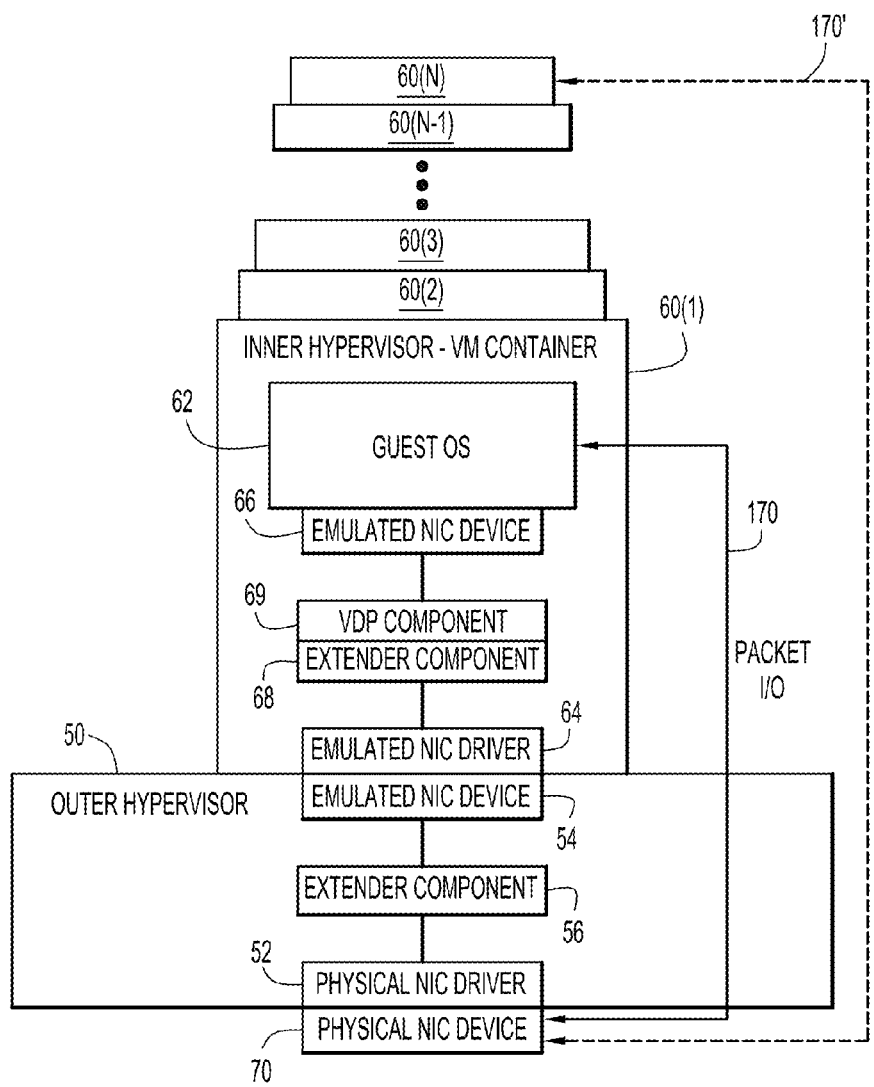
FIG. 6 is a diagram the graphically depicts the direction of packet input/output between a physical network interface card device and a guest operating system running as a virtual machine in an inner hypervisor.

To summarize the operations depicted in FIG. 6, the inner hypervisor transitions from emulation mode to pass-through mode of the NIC device substantially simultaneously with the outer hypervisor transitioning from emulation mode to pass-through mode by forwarding API calls to a NIC device driver associated with the NIC device. Once transition to pass-through is complete for the inner hypervisor and the outer hypervisor, the NIC device manages operations in pass-through mode.

Turning now to FIG. 7, a flow chart 180 is shown for the operations associated with achieving the packet I/O shown in FIG. 6. At 182, the guest OS 62 directly manipulates the VF memory mapped resources including the rings for packet transmission, packet reception and completions events, the interrupt acknowledge and mask registers, the memory of buffer payload, etc. At 184, memory accesses to these resources from the guest OS 62 are translated by the MMU 120, whereas memory accesses from the physical NIC device 70 to these resources are translated by the IOMMU 130.

There is no hypervisor software intervention in the packet I/O path. Therefore, the packet I/O path is very fast. Interrupt event rendezvous happens directly between the VF of the physical NIC device 70 and the inner guest OS 62 with minimal intervention of both hypervisors. When the VF raises an interrupt event, the outer hypervisor 50 forwards the event to the inner hypervisor-VM virtual CPU (vCPU) which, in turn, forwards the event to the inner guest OS vCPU on behalf of its virtual NIC (vNIC), i.e., the emulated NIC device 66.

In summary, presented herein are techniques for using an extender component, such as VM-FEX or 802.1BR PE, in hypervisors to facilitate passing a physical NIC device through multiple hypervisors. A simple extension to the paravirtualized devices models of current hypervisors provides a practical way to achieve multiple hypervisor pass-through with support from currently available hardware.

These techniques afford higher and more predictable performance of VM networking I/O through multiple nested hypervisors because there is no hypervisor software intervention in the packet I/O path. As result, a networking workload running in the VM can potentially benefit from close-to-native networking performance, similar to when the same guest OS is running on a bare metal server. By contrast, state-of-the-art nested hypervisor implementations with support for VM migration introduce per-packet software intervention of the networking stack and of the device emulation of both the nested hypervisors. Such intervention is a source of major system performance overhead when a network bound workload runs in the VM.

In addition, the solution proposed herein has advantages from the point of view of practical implementation in commercial hypervisors and deployment in realistic use cases. Transitions between emulation and pass-through mode do not cause any network reconfiguration or topology change. The system relies on a simple, repetitive and standard network connectivity extender component within each hypervisor (i.e. VM-FEX or PE). Each software component is extended, in particular each variation of emulated NIC device, just enough to support a minimum set of mandatory operations to achieve a generic NIC pass-through model. This solution also supports passing a NIC through more than two, nested, hypervisor containers without requiring additional software or hardware components to be implemented. The physical NIC device hardware support necessary to pass a device through one hypervisor is sufficient. Furthermore, this solution supports naturally the migration of the inner-most VM.

The above description is intended by way of example only.

What is claimed is:

1. A system comprising:
a network interface card device configured to enable communications over a network;
memory configured to store instructions for an outer hypervisor, at least one inner hypervisor and a guest operating system running as a virtual machine in the inner hypervisor;
a computing apparatus coupled to the network interface card device and the memory, wherein the computing apparatus is configured to run multiple nested hypervisors including the outer hypervisor and the inner hypervisor running as a virtual machine on top of the outer hypervisor, wherein the computing apparatus is configured to:
execute an emulated network interface card device in the inner hypervisor and an emulated network interface card device in the outer hypervisor;
execute an extender component in the outer hypervisor and an extender component in the inner hypervisor such that the extender components in the outer hypervisor and the inner hypervisor are architecturally cascaded, wherein the extender components in the outer hypervisor and in the inner hypervisor operate to assign an interface for the guest operating system to the emulated network interface card device in each of the outer hypervisor and the inner hypervisor to enable network communications between the guest operating system and the network interface card device to bypass the outer hypervisor and the inner hypervisor;
execute in the inner hypervisor an emulated network interface card device driver that provides just pass-through related control operations from the outer hypervisor emulated network interface card device to the inner hypervisor, the pass-through related control operations including discovering hardware capabilities of a device virtual function and one or more of allocating, configuring and freeing the device virtual function; and
access the pass-through related control operations using the emulated network interface card device driver.

2. The system of claim 1, wherein the computing apparatus is further configured to execute a virtual interface discovery protocol component terminated on top of the extender component of an innermost hypervisor of multiple nested hypervisors.

3. The system of claim 1, wherein the computing apparatus is further configured to execute the emulated network interface card device in all nested hypervisors such that the emulated network interface card device in the outer hypervisor provides the just pass-through related control operations to the inner hypervisor, and the inner hypervisor accesses the pass-through related control operations using the emulated network interface card device driver.

4. The system of claim 3, wherein the computing apparatus is configured to execute the emulated network interface card device in all nested hypervisors such that:
the emulated network interface card devices in all nested hypervisors operate in an emulation mode or the emulated network interface card devices in all nested hypervisors operate in a pass-through mode.

5. The system of claim 3, wherein the pass-through related control operations including further include one or more of: discovering hardware resources of the device virtual function; configuring hardware resources and features of the device virtual function; setting-up and tearing-down interrupt resources; quiesce-ing the network interface card device; saving and restoring hardware state; and accumulating statistics.

6. The system of claim 1, wherein the computing apparatus is configured to cause the emulated network interface card device in the outer hypervisor to forward the pass-through related control operations to a network interface card device driver associated with the network interface card via application programming interface calls, and wherein the network interface device driver provides returns for each pass-through related control operation to the outer hypervisor, which in turn forwards back the result of each pass-through related control operation to the emulated network interface card device and to the inner hypervisor.

7. The system of claim 1, wherein the extender component comprises virtual machine fabric extender driver software.

8. The system of claim 1, wherein the extender component comprises port extender software according to the IEEE 802.1 BR standard.

9. The system of claim 1, further comprising a memory management unit and an input/output memory management unit, and wherein the computing apparatus is configured to cause the outer hypervisor to program the memory management unit and the input/output memory management unit with mappings from the innermost guest operating system physical memory addresses to corresponding machine memory addresses.

10. The system of claim 9, wherein the computing apparatus is configured to cause the outer hypervisor to set up hardware interrupts to be delivered from the network interface card device to the emulated network interface card device associated with the inner hypervisor.

11. The system of claim 1, wherein the computing apparatus is configured to substantially simultaneously cause the inner hypervisor to transition from emulation mode to pass-through mode of the network interface card device and the outer hypervisor to transition from emulation mode to pass-through mode by forwarding application programming interface calls to a network interface device driver associated with the network interface card device, and so that once transition to pass-through mode is complete for the inner hypervisor and the outer hypervisor, the network interface card device manages operations in the pass-through mode.

12. A method comprising:
in a data center, running multiple nested hypervisors including an outer hypervisor and at least one inner hypervisor running as a virtual machine on top of the outer hypervisor;

running a guest operating system as a virtual machine in the inner hypervisor;

communicating external to the data center by a network interface card device in communication with the outer hypervisor via a network interface card device driver;

executing an emulated network interface card device in the inner hypervisor and an emulated network interface card device in the outer hypervisor;

executing an extender component in the outer hypervisor and an extender component in the inner hypervisor such that the extender components in the outer hypervisor and the inner hypervisor are architecturally cascaded; and using the extender components in the outer hypervisor and in the inner hypervisor, assigning an interface for the guest operating system to the emulated network interface card device in all nested hypervisors to enable network communications between the guest operating system and the network interface card device to bypass the outer hypervisor and the inner hypervisor, wherein the assigning includes:

executing in the inner hypervisor an emulated network interface card device driver that provides just pass-through related control operations from the outer hypervisor emulated network interface card device to the inner hypervisor, the pass-through related control operations including discovering hardware capabilities of a device virtual function and one or more of allocating, configuring and freeing the device virtual function; and accessing the pass-through related control operations using the emulated network interface card device driver.

13. The method of claim 12, further comprising executing a virtual interface discovery protocol component terminated on top of the extender component of an innermost hypervisor of multiple nested hypervisors.

14. The method of claim 12, further comprising executing the emulated network interface card device in the inner hypervisor and the emulated network interface card device in the outer hypervisor such that the emulated network interface card device in the outer hypervisor provides the just pass-through related control operations to the inner hypervisor, and the inner hypervisor accesses the pass-through related control operations using the emulated network interface card device driver.

15. The method of claim 14, further comprising executing the emulated network interface card device in all nested hypervisors such that the emulated network interface card devices in all nested hypervisors operate in an emulation mode or the emulated network interface card devices in all nested hypervisors operate in a pass-through mode.

16. The method of claim 14, further comprising the outer hypervisor setting up hardware interrupts for delivery from the network interface card device to the emulated network interface card device associated with the inner hypervisor.

17. The method of claim 12, further comprising substantially simultaneously transitioning the inner hypervisor from emulation mode to pass-through mode of the network interface card device and the outer hypervisor from emulation mode to pass-through mode by forwarding application programming interface calls to the network interface card device driver associated with the network interface card device, and so that once transition to pass-through mode is complete for the inner hypervisor and the outer hypervisor, the network interface card device manages operations in the pass-through-mode.

18. One or more non-transitory computer readable storage media encoded with software comprising computer executable instructions and when the software is executed operable to:

in a data center computing system, run multiple nested hypervisors including an outer hypervisor and at least one inner hypervisor running as a virtual machine on top of the outer hypervisor;

run a guest operating system as a virtual machine in the inner hypervisor;

execute an emulated network interface card device in the inner hypervisor and an emulated network interface card device in the outer hypervisor;

execute an extender component in the outer hypervisor and an extender component in the inner hypervisor such that the extender components in the outer hypervisor and the inner hypervisor are architecturally cascaded;

using the extender components in the outer hypervisor and in the inner hypervisor, assign an interface for the guest operating system to the emulated network interface card device in all nested hypervisors to enable network communications between the guest operating system and a network interface card device to bypass the outer hypervisor and the inner hypervisor, wherein the instructions operable to assign include instructions operable to:

execute in the inner hypervisor an emulated network interface card device driver that provides just pass-through related control operations from the outer hypervisor emulated network interface card device to the inner hypervisor, the pass-through related control operations including discovering hardware capabilities of a device virtual function and one or more of allocating, configuring and freeing the device virtual function; and access the pass-through related control operations using the emulated network interface card device driver.

19. The one or more computer readable storage media of claim 18, further comprising instructions operable to execute a virtual interface discovery protocol component terminated on top of the extender component of an innermost hypervisor of multiple nested hypervisors.

20. The one or more computer readable storage media of claim 18, further comprising instructions operable to execute the emulated network interface card device in all nested hypervisors such that the emulated network interface card device in the outer hypervisor provides the just pass-through related control operations to the inner hypervisor, and the inner hypervisor accesses the pass-through related control operations using the emulated network interface card device driver.

21. The one or more computer readable storage media of claim 20, further comprising instructions operable to execute the emulated network interface card device all nested hypervisors such that the emulated network interface card devices in all nested hypervisors operate in an emulation mode or the emulated network interface card device in all nested hypervisors operate in a pass-through mode.

* * * * *